US010655576B2

(12) United States Patent
Oh et al.

(10) Patent No.: US 10,655,576 B2
(45) Date of Patent: May 19, 2020

(54) SECONDARY AIR INJECTION SYSTEM (71) Applicants: Hyundai Motor Company, Seoul (KR); Kia Motors Corporation, Seoul (KR)

(72) Inventors: Heechang Oh, Suwon-si (KR); Jong Il Park, Seoul (KR); Seungwoo Hong, Seoul (KR); Yeongseop Park, Seoul (KR); Dong Hee Han, Seoul (KR); Hyungbok Lee, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 22 days.

(21) Appl. No.: 16/151,676

(22) Filed: Oct. 4, 2018

(65) Prior Publication Data

US 2019/0316551 A1 Oct. 17, 2019

(30) Foreign Application Priority Data

Apr. 17, 2018 (KR) ........................ 10-2018-0044200

(51) Int. Cl.
*F02M 26/03* (2016.01)
*F02M 26/08* (2016.01)
*F02M 35/10* (2006.01)
*F02B 29/04* (2006.01)
*F02D 41/00* (2006.01)
(Continued)

(52) U.S. Cl.
CPC ......... *F02M 35/10222* (2013.01); *F01N 3/30* (2013.01); *F01N 13/10* (2013.01); *F02B 29/04* (2013.01); *F02B 37/04* (2013.01); *F02B 39/10* (2013.01); *F02D 41/005* (2013.01); *F02D 41/0007* (2013.01); *F02M 26/03* (2016.02); *F02M 26/08* (2016.02); *F02M 26/14* (2016.02); *F02M 26/21* (2016.02); *F02M 26/65* (2016.02); *F02M 35/10006* (2013.01); (Continued)

(58) Field of Classification Search
CPC ....... F02M 35/10222; F02M 35/10006; F02M 35/10157; F02M 26/65; F02M 26/08; F02M 26/03; F02M 26/14; F02M 26/21; F02B 39/10; F02B 37/04; F01N 3/30; F01N 13/10; F02D 41/0007; F02D 41/005; F02D 41/025; F02D 41/0055; F02D 2200/08
USPC ...... 60/602, 605.2, 280, 287, 288, 289, 290, 60/299–301
See application file for complete search history.

(56) References Cited

U.S. PATENT DOCUMENTS

2017/0335748 A1* 11/2017 Zhang .................... F02M 26/05
2018/0016967 A1* 1/2018 Moore .................... F02B 33/44

FOREIGN PATENT DOCUMENTS

EP         1300558 A1 *  4/2003 ............ F02M 26/71
KR    10-2013-0141164 A    12/2013

* cited by examiner

*Primary Examiner* — Thai Ba Trieu
*Assistant Examiner* — Dapinder Singh
(74) *Attorney, Agent, or Firm* — Morgan, Lewis & Bockius LLP (57) ABSTRACT

A secondary air injection system may include an engine that includes a plurality of cylinders that generate a driving torque of a vehicle by combustion of a fuel; a main line connected to an exhaust manifold or an exhaust line which is connected to the plurality of cylinders; a recirculation line which is branched from the main line and then connected to an intake manifold; an air injection line which is branched from the main line and then connected to an intake line; and an electric supercharger which is provided in the intake line.

11 Claims, 9 Drawing Sheets

(51) Int. Cl.
*F02B 39/10* (2006.01)
*F02M 26/65* (2016.01)
*F02B 37/04* (2006.01)
*F02M 26/14* (2016.01)
*F02M 26/21* (2016.01)
*F01N 3/30* (2006.01)
*F01N 13/10* (2010.01)

(52) U.S. Cl.
CPC .................. *F02M 35/10157* (2013.01); *F02M 35/10229* (2013.01); *F02D 2200/08* (2013.01)

SECONDARY AIR INJECTION SYSTEM

CROSS-REFERENCE TO RELATED APPLICATION

The present application claims priority to Korean Patent Application No. 10-2018-0044200 filed on Apr. 17, 2018, the entire contents of which is incorporated herein for all purposes by this reference.

BACKGROUND OF THE INVENTION

Field of the Invention

The present invention relates to a secondary air injection system. More particularly, the present invention relates to a secondary air injection system that can share an air injection line for exhaust gas recirculation and an air injection line for secondary air injection, and can use an electric supercharger as a pump for secondary air injection.

Description of Related Art

In general, an intake/exhaust system of a vehicle supplies intake air to an engine through an intake manifold, and the intake air supplied to the engine is discharged to the outside through an exhaust manifold after combustion in the engine.

In the instant case, exhaust gas discharged from the engine may include not only harmless materials such as water vapor ($H_2O$), nitrogen ($N_2$), carbon dioxide ($CO_2$), and the like, but also toxic materials such as carbon monoxide (CO), hydrocarbons (HC), nitrogen oxides ($NO_x$), and the like.

Thus, a secondary air injection system that evokes post combustion by supplying air to the exhaust gas is used to remove such toxic materials.

A secondary air injection system according to a conventional art supplies compressed air to an exhaust manifold through a secondary air pump, and then harmful components in the compressed air, supplied to the exhaust manifold, are reduced and then converted to harmless components by a catalytic converter. Through such a process, the exhaust gas is emitted to the outside.

That is, the secondary air pump is used to supply air to an exhaust system at an early operation stage, and the internal to the cylinder is burned richly to reduce harmful components (e.g., unburned hydrocarbons) included in the exhaust gas through the air supplied to the exhaust system.

However, the conventional secondary air injection system requires an additional air pump, thereby causing an increase of the weight, volume, and manufacturing cost of the vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a secondary air injection system having a new structure that can reduce the weight, volume, and manufacturing cost of a vehicle by eliminating an additional air pump for secondary air injection.

A secondary air injection system according to an exemplary embodiment of the present invention include: an engine that may include a plurality of cylinders that generate a driving torque of a vehicle by combustion of a fuel; a main line connected to an exhaust manifold or an exhaust line which is connected to the plurality of cylinders; a recirculation line which is branched from the main line and then connected to an intake manifold; an air injection line which is branched from the main line and then connected to an intake line; and an electric supercharger which is provided in the intake line.

The air injection line may be connected to an intake line at a downstream side of the electric supercharger.

The secondary air injection system according to the exemplary embodiment of the present invention may further include an intercooler which is provided in the main line.

The secondary air injection system according to the exemplary embodiment of the present invention may further include: a recirculation valve which is provided in the recirculation line to control an amount of a recirculation gas recirculated through the main line and the recirculation line; and an air amount control valve which is provided in the air injection line and controls an air amount injected to the exhaust manifold or the exhaust line through the air injection line and the main line.

When exhaust gas recirculation is required, the air amount control valve may be closed and the recirculation valve may be opened such that an exhaust gas is supplied to the intake manifold from the exhaust manifold or the exhaust line.

When secondary air injection is required, the recirculation valve may be closed and the air amount control valve may be opened, and the electric supercharger may operate to inject air to the exhaust manifold or the exhaust line from the intake line.

The secondary air injection system according to the exemplary embodiment of the present invention may further include an exhaust gas purification device which is provided in the exhaust line to purify an exhaust gas.

A secondary air injection system according to various exemplary embodiments of the present invention may include: an engine including a plurality of cylinders that generate a driving torque of a vehicle by combustion of a fuel; a main line connected to an exhaust manifold or an exhaust line which is connected to the plurality of cylinders; a recirculation line which is branched from the main line and then connected to an intake manifold; an air injection line which is branched from the main line and then connected to an intake line; a bypass line which is branched from one side of the intake line and then connected to the other side of the intake line; and an electric supercharger provided in the intake line.

The air injection line may be connected to an intake line at a downstream side of the electric supercharger.

The secondary air injection system according to the other exemplary embodiment of the present invention may further include: a recirculation valve which is provided in the recirculation line and controls an amount of recirculation gas recirculated through the main line and the recirculation line; a three-way air amount control valve which is provided at a location where the air injection line and the intake line are connected and controls an air amount injected to the exhaust manifold or the exhaust line through the air injection line and the main line; and a bypass valve provided in the bypass line.

When exhaust gas recirculation is required, the three-way air amount control valve may be opened such that the intake line fluidically-communicates and the intake line and the air injection line are blocked, and the recirculation valve may be opened such that an exhaust gas is supplied to the intake manifold from the exhaust manifold or the exhaust line.

When secondary air injection is required, the recirculation valve may be closed, and the three-way air amount control valve may be opened such that the intake line and the air injection line fluidically-communicate with each other and the intake line is blocked, and the electric supercharger may operate to inject air to the exhaust manifold or the exhaust line from the intake line.

The secondary air injection system according to other exemplary embodiment of the present invention may further include an exhaust gas purification device which is provided in the exhaust line to purify the exhaust gas.

A secondary air injection system according to various exemplary embodiments of the present invention may include: an engine including a plurality of cylinders that generate a driving torque of a vehicle by combustion of a fuel; a main line connected to an exhaust manifold or an exhaust line which is connected to the plurality of cylinders; a turbocharger including a turbine which is provided in the exhaust line and rotates by an exhaust gas flowing through the exhaust line and a compressor which is provided in an intake line and rotates by a torque of the turbine to compress intake air flowing through the intake line; a recirculation line which is branched from the main line and then connected to an intake line at an upstream side of the compressor; an air injection line which is branched from the main line and then connected to an intake line at a downstream side of the compressor; a bypass line which is branched from one side of the intake line and then connected to the other side of the intake line; and an electric supercharger which is provided in the intake line.

The secondary air injection according to the other exemplary embodiment of the present invention may further include a recirculation valve which is provided in the recirculation line to control an amount of a recirculation gas recirculated through the main line and the recirculation line; a three-way air amount control valve which is provided at a location where the air injection line and the intake line are connected and controls an air amount injected to the exhaust manifold or the exhaust line through the air injection line and the main line; and a bypass valve provided in the bypass line.

When exhaust gas recirculation is required, the three-way air amount control valve may be opened such that the intake line fluidically-communicates and the intake line and the air injection line are blocked, and the recirculation valve may be opened such that an exhaust gas is supplied to the intake manifold from the exhaust manifold or the exhaust line.

When secondary air injection is required, the recirculation valve may be closed, and the three-way air amount control valve may be opened such that the intake line and the air injection line fluidically-communicate with each other and the intake line is blocked, and the electric supercharger may operate to inject air to the exhaust manifold or the exhaust line from the intake line.

The secondary air injection system according to the other exemplary embodiment of the present invention may further include an exhaust gas purification device which is provided in the exhaust line to purify the exhaust gas.

According to the exemplary embodiments of the present invention, the secondary air injection system can perform secondary air injection to an exhaust system by use of an electric supercharger, and accordingly, an additional air pump for secondary air injection may be omitted.

Furthermore, the recirculation line for exhaust gas recirculation and the air injection line for secondary air injection may be shared. Accordingly, the weight, the volume, and the manufacturing cost of a vehicle may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Since the size and the thickness of each configuration shown in drawings are arbitrarily indicated for better understanding and ease of description, the present invention is not limited to shown drawings, and the thickness of layers, films, panels, regions, etc., are exaggerated for clarity.

Hereinafter, a secondary air injection system according to various exemplary embodiments of the present invention will be described in detail with reference to the accompanying drawings.

Figure 1:
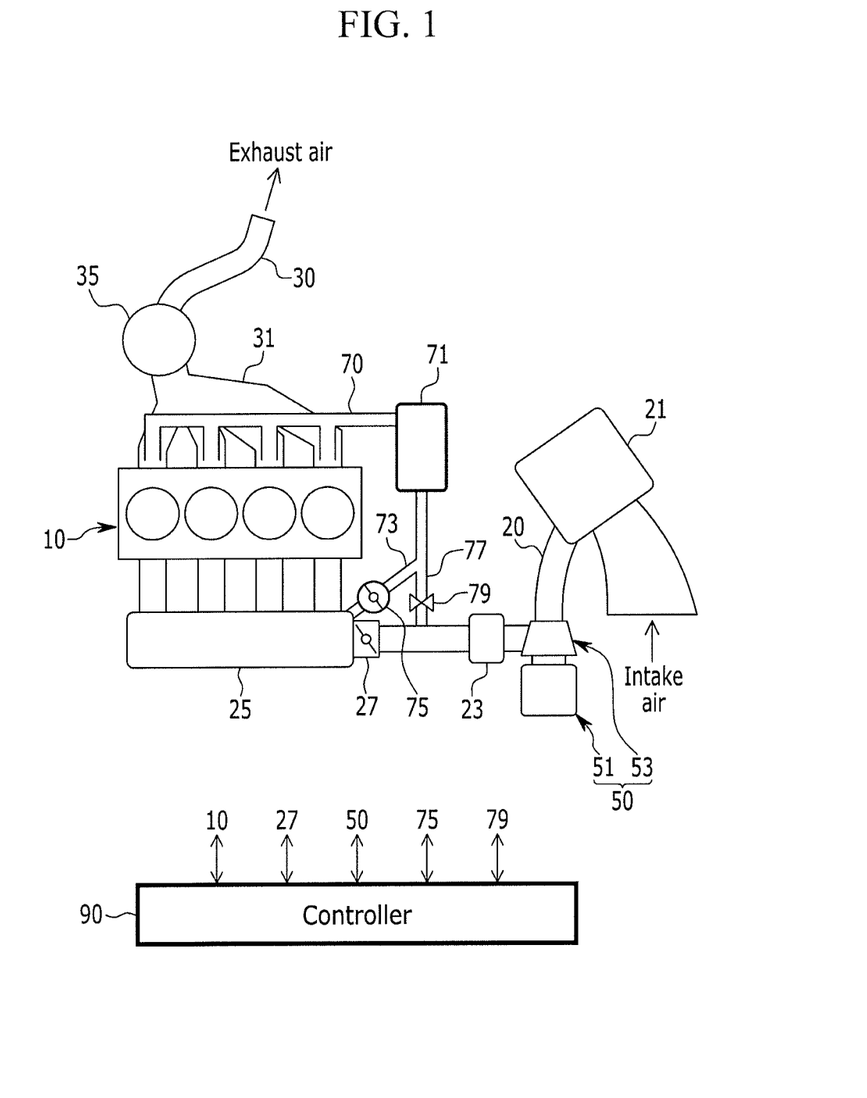
FIG. 1 is a schematic view of a secondary air injection system according to various exemplary embodiments of the present invention.

FIG. 1 is a schematic view of a secondary air injection system according to various exemplary embodiments of the present invention.

As shown in FIG. 1, a secondary air injection system according to the various exemplary embodiments of the present invention includes an engine 10, a main line 70, a recirculation line 73, an air injection line 77, and an electric supercharger 50.

The engine 10 includes a plurality of cylinders that generate driving torque from combustion, an intake line 20 through which intake air supplied to the engine 10 flows is connected to the engine 10 through an intake manifold 25, and an exhaust line 30 through which the exhaust gas emitted from the engine 10 is connected to the engine 10 through an exhaust manifold 31. The engine 10 may be provided as a four-cylinder engine having four cylinders.

A throttle valve 27 is provided in the intake manifold 25, and an amount of intake air supplied to the cylinders may be adjusted by an opening amount of the throttle valve 27.

An air cleaner 21 that purifies intake air from the outside thereof is provided in the intake line 20, and an exhaust gas purification device 35 that purifies exhaust gas is provided in the exhaust line 30.

The exhaust gas purification device 35 may include a warm-up catalytic converter (WCC) catalyst and an underfloor catalytic converter (UCC) catalyst which is provided on the bottom portion of the vehicle. The WCC catalyst is disposed close to the engine 10, and is a three-way catalyst in which a purification rate for THC, $NO_x$, and CO is excellent. The UCC is disposed at a predetermined location in the exhaust line 30 connected to the WCC.

The main line 70 is connected to the exhaust manifold 31 or the exhaust line 30. A recirculation cooler 71 may be provided in the main line 70. The recirculation cooler 71 cools re-circulated high-temperature exhaust gas.

The recirculation line 73 is branched from an end portion of the main line 70 and then connected to the intake manifold 25. A recirculation valve 75 that adjusts an amount of recirculated gas that recirculates through the main line 70 and the recirculation line 73 is provided in the recirculation line 73.

That is, the main line 70 and the recirculation line 73 perform functions as an exhaust gas recirculation (EGR) device that re-supplies some of the exhaust gas from the exhaust line 30 or from the exhaust manifold 31 to the cylinders.

The air injection line 77 is branched from an end portion of the main line 70 and then connected to the intake line 20. An air amount control valve 79 that controls an air amount injected to the exhaust manifold 31 or the exhaust line 30 through the air injection line 77 and the main line 70 is provided in the air injection line 77.

Some of air that flows through the intake line 20 is supplied to the exhaust line 30 or the exhaust manifold 31 through the main line 70 and the air injection line 77 by the electric supercharger. That is, the main line 70, the air injection line 77, and the electric supercharger 50 perform functions as an air injection device.

The electric supercharger 50 is provided in the intake line 20 to supply supercharged air to the cylinders, and includes a motor 51 and an electric compressor 53. The electric compressor 53 operates by the motor 51 and compresses external air according to operation conditions and supplies the compressed air to the cylinder.

An intercooler 23 is provided in the intake line 20 at a downstream side of the electric supercharger 50, and the air compressed by the electric supercharger 50 is cooled by the intercooler 23.

The secondary air injection system according to the various exemplary embodiments of the present invention may include a controller 90 that controls operations of the engine 10, the throttle valve 27, the electric supercharger 50, the recirculation valve 75, and the air amount control valve 79. That is, the engine 10, the throttle valve 27, the electric supercharger 50, the recirculation valve 75, and the air amount control valve 79 operate by control signals of the controller 90.

Thus, the controller 90 may include at least one processor which is operated by a predetermined program, and the predetermined program performs respective steps of the method for controlling the secondary air injection system according to the various exemplary embodiments of the present invention.

Hereinafter, operation of the secondary air injection system according to the various exemplary embodiments of the present invention will be described in detail with reference to the accompanying drawings.

Figure 2:
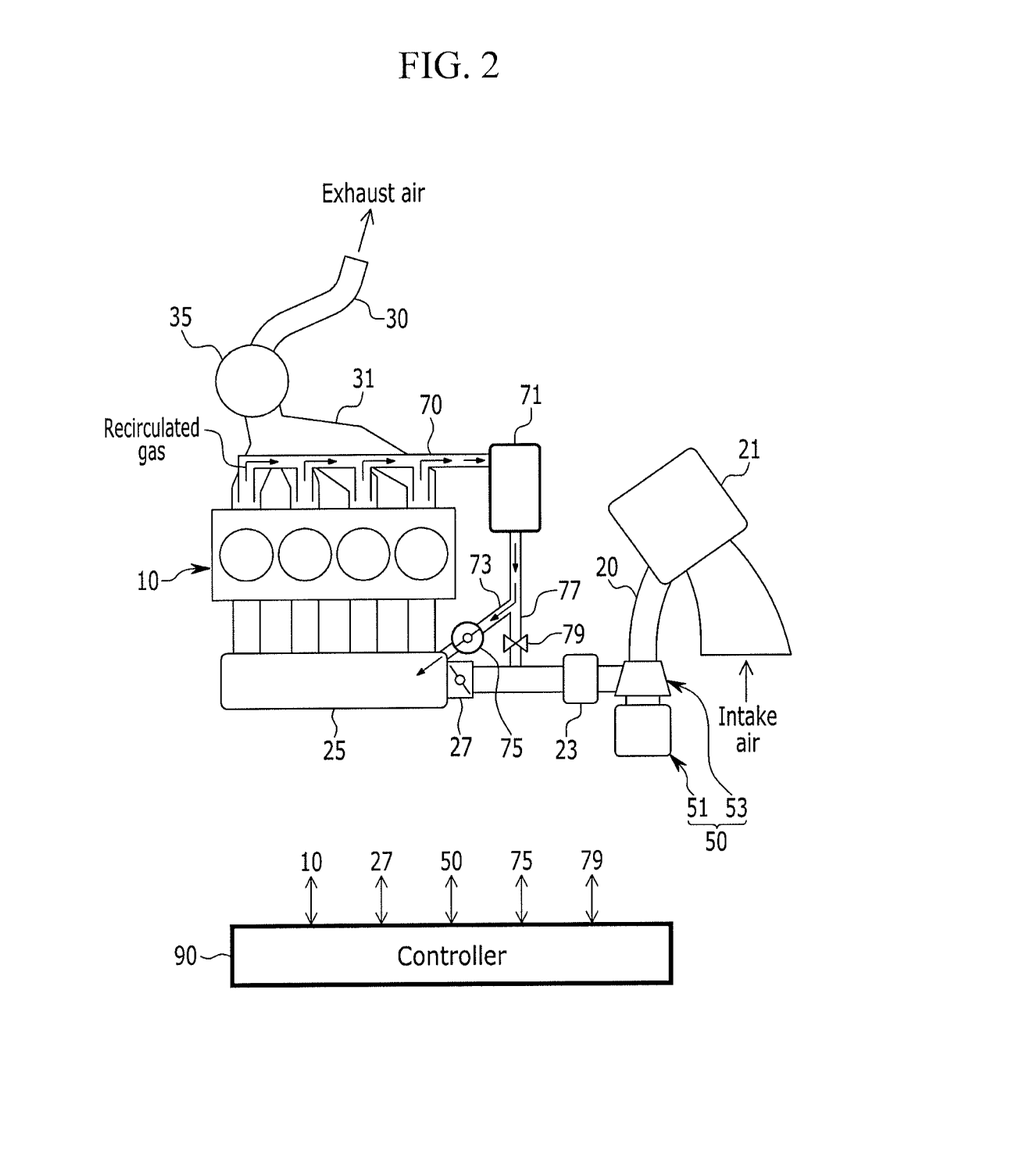
FIG. 2 and FIG. 3 are provided for description of operation of the secondary air injection system according to the various exemplary embodiments of the present invention.
Figure 3:
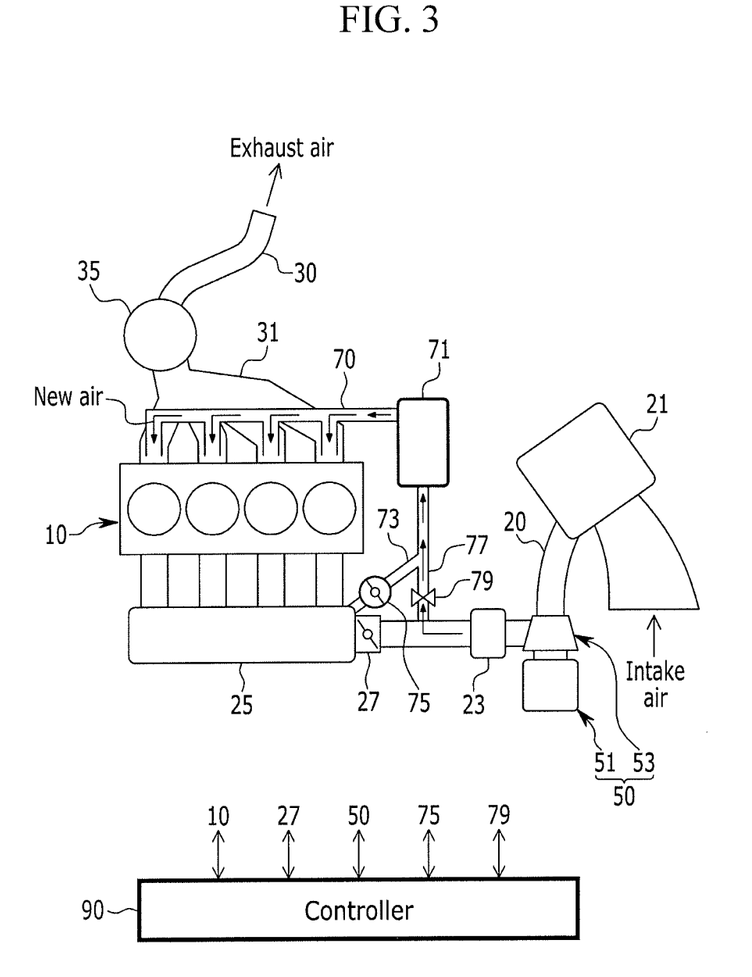

FIG. 2 and FIG. 3 are provided for description of operation of the secondary air injection system according to the various exemplary embodiments of the present invention.

First, when exhaust gas needs to be recirculated to the engine 10, the controller 90 controls to close the air amount control valve 79 and open the recirculation valve 75.

As shown in FIG. 2, some of exhaust gas flowing through an exhaust system (i.e., the exhaust manifold 31 or the exhaust line 30) is supplied to the intake manifold 25 through the main line 70 and the recirculation line 73 and then introduced into the cylinders of the engine 10. The recirculated exhaust gas is cooled by the recirculation cooler 71 and thus cooling efficiency is increased, and a recirculation rate is controlled by a degree of opening of the recirculation valve 75. Furthermore, intake air is compressed by the electric supercharger 50 and thus supplied to the cylinders of the engine 10 through the intake line 20.

When secondary air injection to an exhaust system (i.e., the exhaust manifold 31 or the exhaust line 30) is required, the controller 90 controls to close the recirculation valve 75 and open the air amount control valve 79, and operates the electric supercharger 50.

As shown in FIG. 3, air flowing through the intake line 20 is supplied to the exhaust system through the air injection line 77 and the main line 70. As such, exhaust gas is post-combusted by the secondary air supplied to the exhaust system such that harmful components included in the exhaust gas are removed.

Next, a secondary air injection system according to various exemplary embodiments of the present invention will be described in detail with reference to the accompanying drawings.

Figure 4:
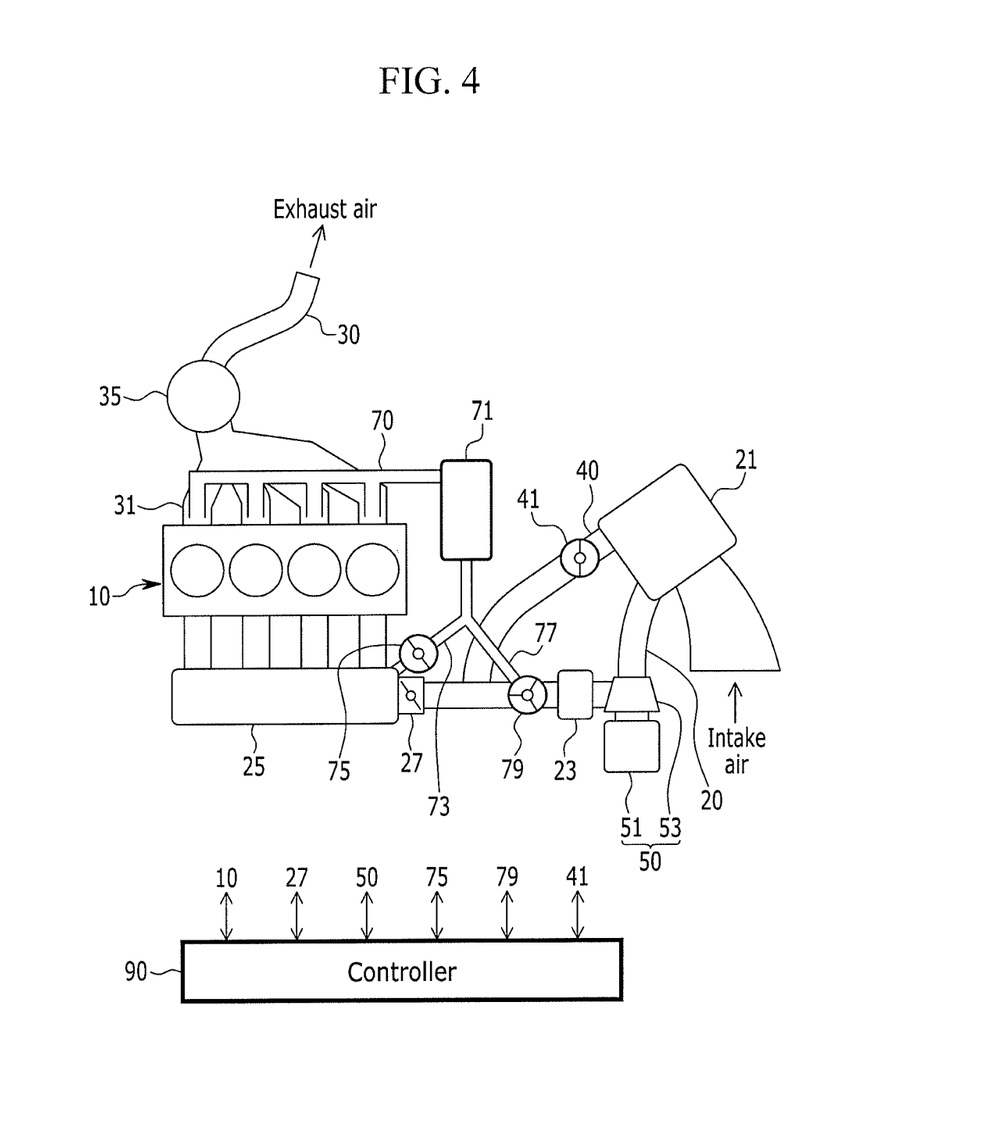
FIG. 4 is a schematic view of a secondary air injection system according to various exemplary embodiments.

FIG. 4 is a schematic view of a configuration of the secondary air injection system according to the various exemplary embodiments of the present invention.

Hereinafter, only the portions that are different from the various exemplary embodiments of the present invention in FIG. 1 will be described in detail.

The secondary air injection system according to the various exemplary embodiments of the present invention includes an engine 10, a main line 70, a recirculation line 73, an air injection line 77, a bypass line 40, and an electric supercharger 50.

The main line 70 is connected to an exhaust manifold 31 or an exhaust line 30. A recirculation cooler 71 may be provided in the main line 70. The recirculation cooler 71 cools recirculated high-temperature exhaust gas.

The recirculation line 73 is branched from an end portion of the main line 70 and connected to the intake manifold 25. A recirculation valve 75 that adjusts an amount of recirculated gas that recirculates through the main line 70 and the recirculation line 73 is provided in the recirculation line 73.

That is, the main line 70 and the recirculation line 73 perform functions as an exhaust gas recirculation (EGR) device that re-supplies some of the exhaust gas from the exhaust line 30 or from the exhaust manifold 31 to the cylinders.

The air injection line 77 is branched from an end portion of the main line 70 and then connected to the intake line 20. A three-way air amount control valve 79 that controls an air amount injected to the exhaust system (i.e., the exhaust manifold 31 or the exhaust line 30) through the air injection line 77 and the main line 70 is provided in the air injection line 77. The intake line 20 and the air injection line 77 may fluidically-communicate with each other and the intake line 20 between the electric supercharger 50 and the intake manifold 25 may be blocked, or the intake line 20 and the air injection line 77 may be blocked and the intake line 20 between the electric supercharger 50 and the intake manifold 25 may be fluidically-communicated by an operation of the three-way air amount control valve 79. That is, when the intake line 20 and the air injection line 77 are fluidically-communicate with each other and the intake line 20 between the electric supercharger 50 and the intake manifold 25 is blocked, the intake air compressed by the electric supercharger 50 is supplied to the air injection line 77 through the intake line 20. When the intake line 20 and the air injection line 77 are blocked and the intake line 20 between the electric supercharger 50 and the intake manifold 25 is fluidically-communicated, the intake air compressed by the electric supercharger 50 is supplied to the intake manifold 25 through the intake line 20. A configuration of the three-way valve is known to an ordinarily skilled person in the art, and therefore no further description will be provided.

Air flowing through the intake line 20 is supplied to the exhaust line 30 or the exhaust manifold 31 through the main line 70 and the air injection line 77 by the electric supercharger 50. That is, the main line 70, the air injection line 77, and the electric supercharger 50 perform functions as an air injection device.

The bypass line 40 is branched from one side of the intake line 20 and then connected to the other of the intake line 20. That is, the bypass line 40 is branched from the intake line 20 at an upstream side of the electric supercharger 50 and then connected to the intake line 20 at a downstream side of the air amount control valve 79. The bypass line 40 is provided with a bypass valve 41.

The secondary air injection system according to the various exemplary embodiments of the present invention may include a controller 90 that controls operations of a throttle valve 27, the electric supercharger 50, the recirculation valve 75, the bypass valve 41, and the air amount control valve 79. That is, the engine 10, the throttle valve 27, the electric supercharger 50, the recirculation valve 75, the bypass valve 41, and the air amount control valve 79 operate by control signals of the controller 90.

Thus, the controller 90 may include at least one processor which is operated by a predetermined program, and the predetermined program performs respective steps of the method for controlling the secondary air injection system according to the various exemplary embodiments of the present invention.

Hereinafter, operation of the secondary air injection system according to the various exemplary embodiments of the present invention will be described in detail with reference to the accompanying drawings.

Figure 5:
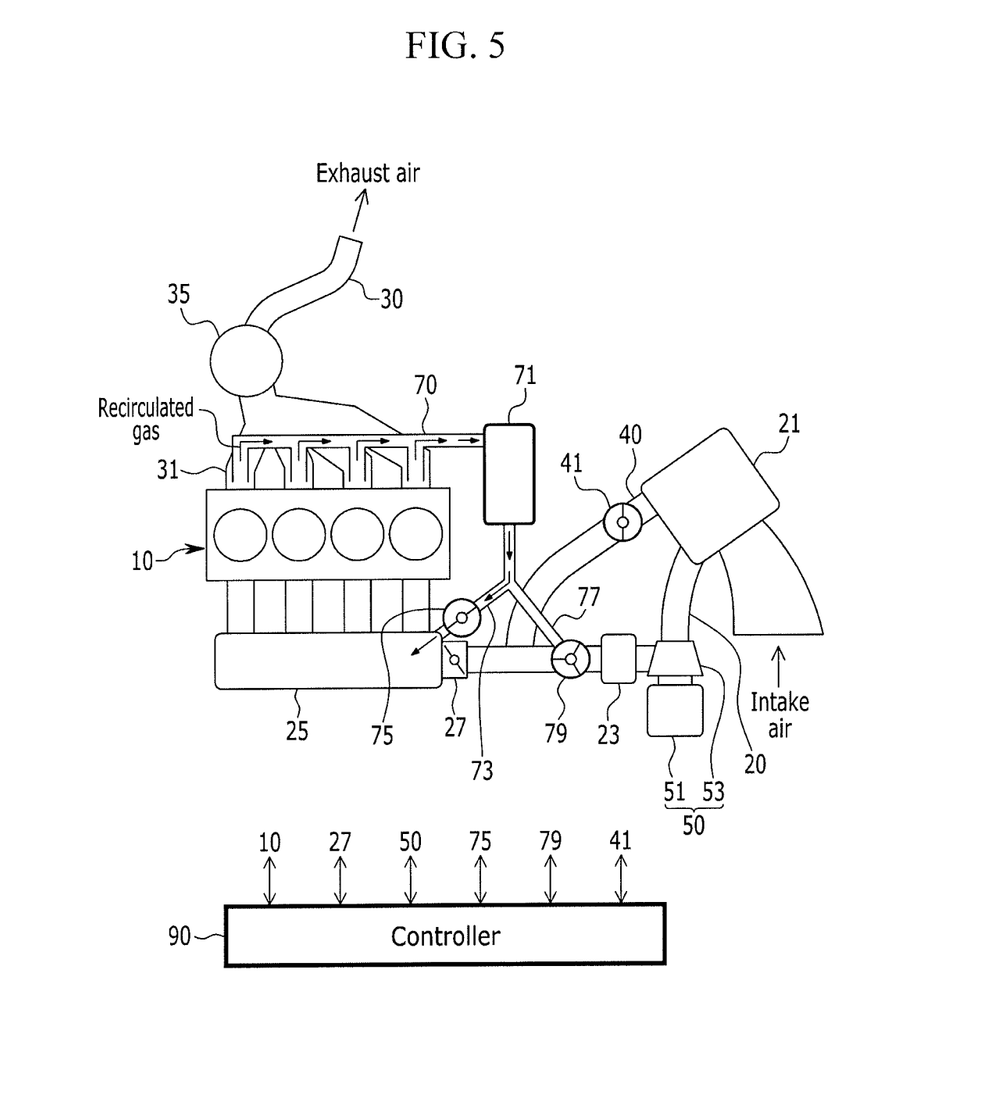
FIG. 5 and FIG. 6 are provided for description of operation of the secondary air injection system according to the various exemplary embodiments of the present invention.
Figure 6:
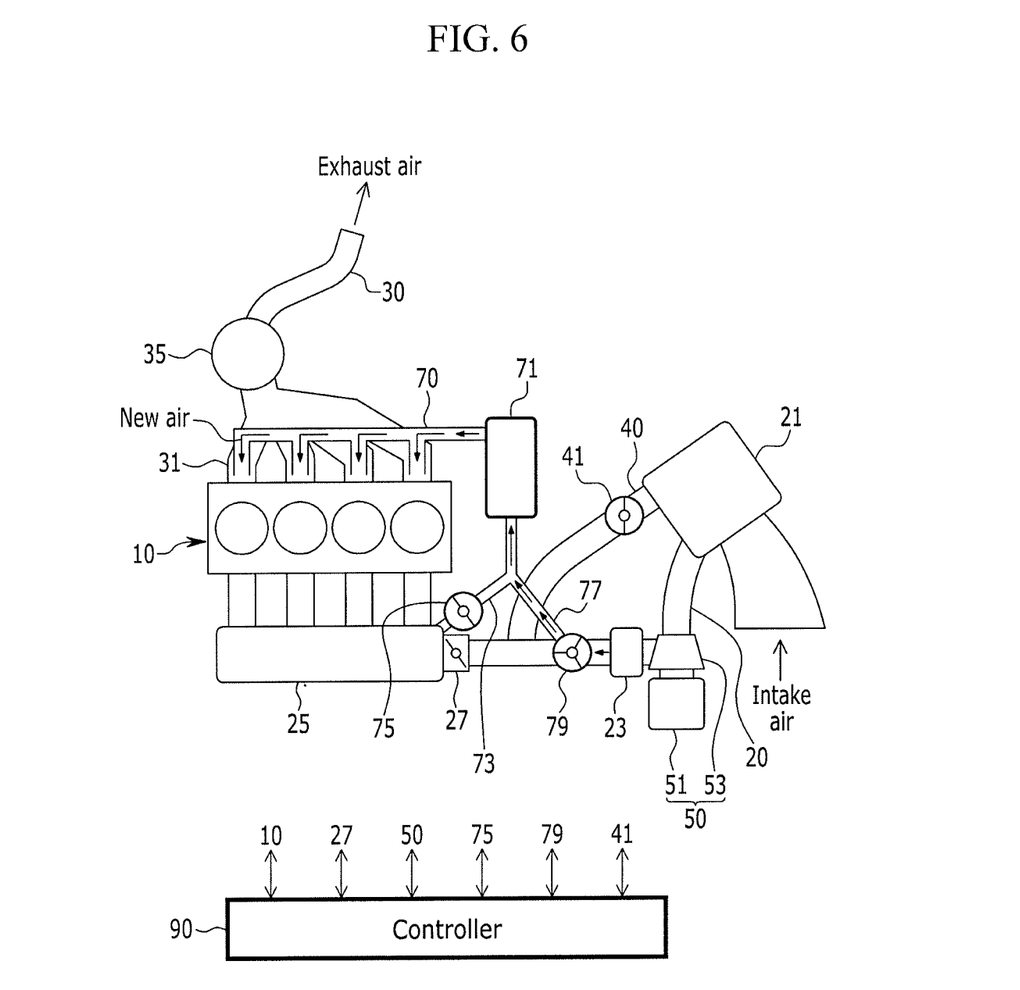

FIG. 5 and FIG. 6 are provided for description of operation of the secondary air injection system according to the various exemplary embodiments of the present invention.

First, when exhaust gas needs to be recirculated to the engine 10, the controller 90 controls the exhaust line 30 to be fluidically-communicated and the intake line 20 and the air injection line 77 to be blocked through the three-way air amount control valve 79. Furthermore, the controller 90 controls the recirculation valve 75 to be opened.

As shown in FIG. 5, some of the exhaust gas flowing through the exhaust system is supplied to the intake manifold 25 through the main line 70 and the recirculation line 73, and is thus introduced to the cylinders of the engine 10. The recirculated exhaust gas is cooled by the recirculation cooler 71 and thus efficiency is increased, and a recirculation rate is controlled by a degree of opening of the recirculation valve 75. Furthermore, intake air is compressed by the electric supercharger 50 and supplied to the cylinders of the engine 10 through the intake line 20.

In an exemplary embodiment of the present invention, the bypass valve 41 may be selectively opened according to a driving condition of the vehicle.

When secondary air injection to an exhaust system (i.e., the exhaust manifold 31 or the exhaust line 30) is required, the controller 90 controls the recirculation valve 75 to be closed, the intake line 20 and the air injection line 77 to fluidically-communicate with each other and the intake line 20 to be blocked through the three-way air amount control valve 79, and the bypass valve 41 to be opened. Furthermore, the controller 90 operates the electric supercharger 50.

As shown in FIG. 6, air flowing through the intake line 20 is compressed by the electric supercharger 50 and then the compressed air is supplied to the exhaust system through the air injection line 77 and the main line 70. As such, exhaust gas is post-combusted by the secondary air supplied to the exhaust system such that harmful components included in the exhaust gas are removed. Furthermore, intake air is supplied to the cylinder of the engine 10 through the bypass line 40.

Next, a secondary air injection system according to various exemplary embodiments of the present invention will be described in detail with reference to the accompanying drawings.

Figure 7:
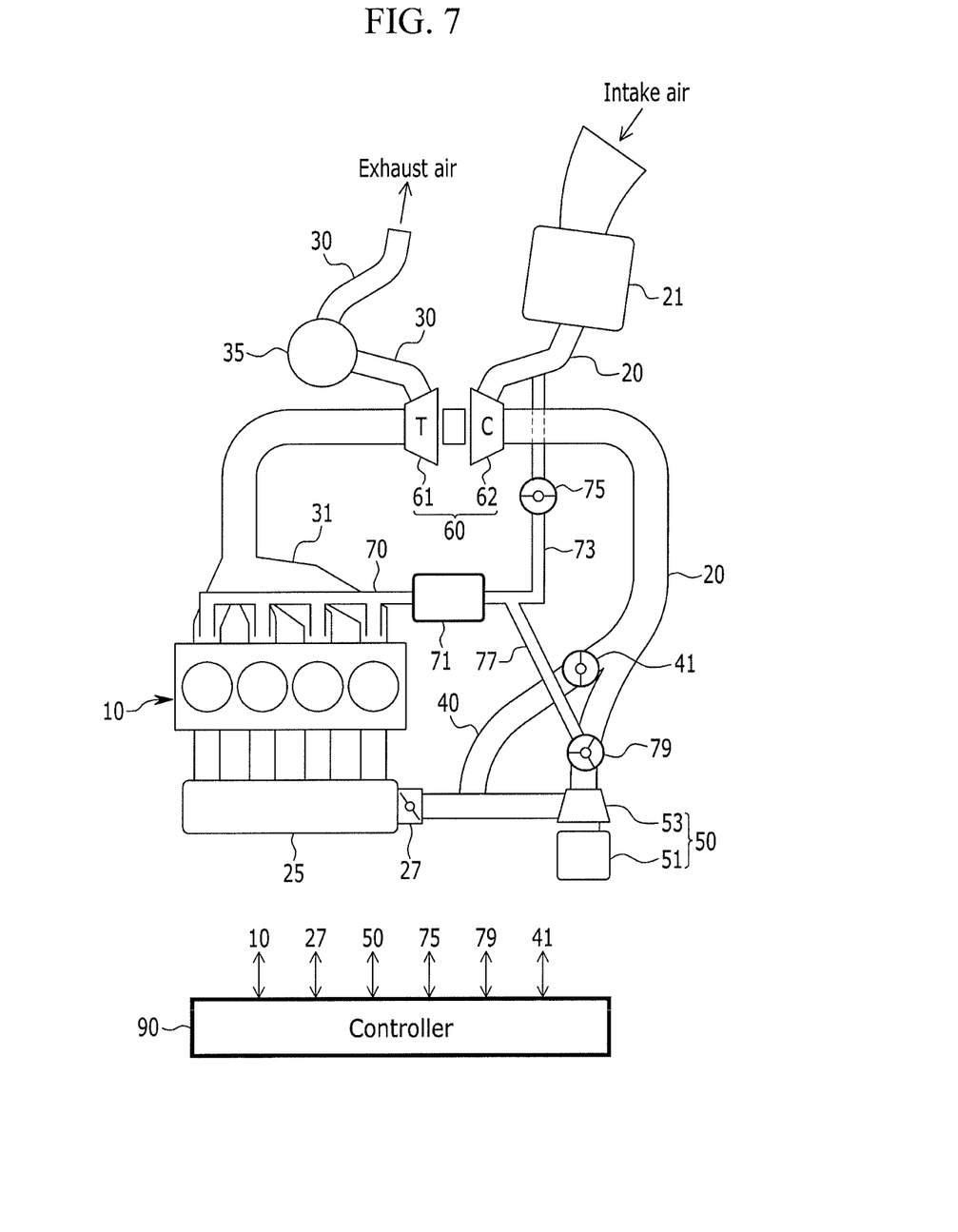
FIG. 7 is a schematic view of a configuration of a secondary air injection system according to various exemplary embodiments of the present invention.

FIG. 7 is a schematic view of a configuration of a secondary air injection system according to various exemplary embodiments of the present invention.

Hereinafter, only portions that are different from the various exemplary embodiments of the present invention in FIGS. 1 and 4 will be described in detail.

The secondary air injection system according to the various exemplary embodiments of the present invention includes an engine 10, a main line 70, a recirculation line 73, an air injection line 77, a bypass line 40, a turbocharger 60, and an electric supercharger 50.

The turbocharger 60 is provided to supply supercharged air to cylinders, and includes a turbine 61 provided in an exhaust line 30 and rotates by exhaust gas flowing through the exhaust gas 30, and a compressor 62 which is provided in an intake line 20 and rotates by torque of the turbine 61 to compress intake air flowing through the intake line 20.

The main line 70 is connected to the exhaust manifold 31 or the exhaust line 30. The main line 70 may be provided with a recirculation cooler 71. The recirculation cooler 71 cools recirculated high-temperature exhaust gas.

The recirculation line 73 is branched from an end portion of the main line 70 and then connected to the intake line 20 at an upstream side of the compressor 62. A recirculation valve 75 that controls an amount of recirculation gas which is recirculated through the main line 70 and the recirculation line 73 is provided in the recirculation line 73.

The main line 70 and the recirculation line 73 perform functions as an exhaust gas recirculation (EGR) device that re-supplies some of the exhaust gas from the exhaust line 30 or from the exhaust manifold 31 to the cylinders.

The air injection line 77 is branched from an end portion of the main line 70 and then connected to the intake line 20 at a downstream side of the compressor 62. A three-way air amount control valve 79 that controls an air amount injected to the exhaust system (i.e., the exhaust manifold 31 or the exhaust line 30) through the air injection line 77 and the main line 70 is provided in the air injection line 77. The intake line 20 and the air injection line 77 may fluidically-communicate with each other and the intake line 20 between the electric supercharger 50 and the intake manifold 25 may be blocked, or the intake line 20 and the air injection line 77 may be blocked and the intake line 20 between the electric supercharger 50 and the intake manifold 25 may be fluidically-communicated by an operation of the three-way air amount control valve 79. That is, when the intake line 20 and the air injection line 77 are fluidically-communicate with each other and the intake line 20 between the electric supercharger 50 and the intake manifold 25 is blocked, the intake air compressed by the electric supercharger 50 is supplied to the air injection line 77 through the intake line 20. When the intake line 20 and the air injection line 77 are blocked and the intake line 20 between the electric supercharger 50 and the intake manifold 25 is fluidically-communicated, the intake air compressed by the electric supercharger 50 is supplied to the intake manifold 25 through the intake line 20.

Air flowing through the intake line 20 is supplied to the exhaust line 30 or the exhaust manifold 31 through the main line 70 and the air injection line 77 by the electric supercharger 50. That is, the main line 70, the air injection line 77, and the electric supercharger 50 perform functions as an air injection device.

The bypass line 40 is branched from one side of the intake line 20 and then connected to the other of the intake line 20. That is, the bypass line 40 is branched from the intake line 20 at an upstream side of the electric supercharger 50 and then connected to the intake line 20 at a downstream side of the air amount control valve 79. The bypass line 40 is provided with a bypass valve 41.

The secondary air injection system according to the various exemplary embodiments of the present invention may include a controller 90 that controls operations of a throttle valve 27, the electric supercharger 50, the recirculation valve 75, the bypass valve 41, and the air amount control valve 79. That is, the engine 10, the throttle valve 27, the electric supercharger 50, the recirculation valve 75, the bypass valve 41, and the air amount control valve 79 operate by control signals of the controller 90.

Thus, the controller 90 may include at least one processor which is operated by a predetermined program, and the predetermined program performs respective steps of the method for controlling the secondary air injection system according to the various exemplary embodiments of the present invention.

Hereinafter, operation of the secondary air injection system according to the various exemplary embodiments of the present invention will be described in detail with reference to the accompanying drawings.

Figure 8:
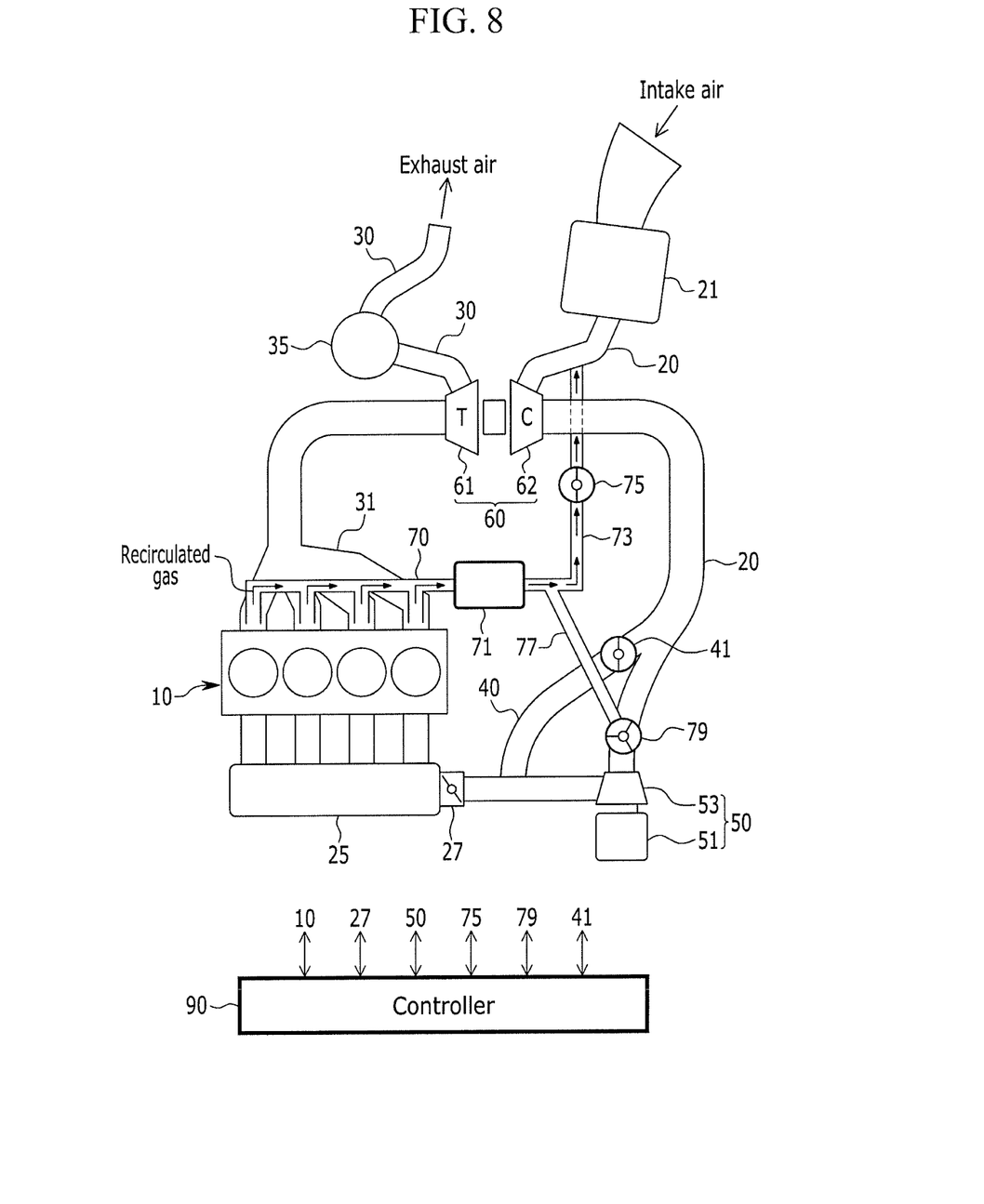
FIG. 8 and FIG. 9 are provided for description of operation of the secondary air injection system according to the various exemplary embodiments of the present invention.
Figure 9:
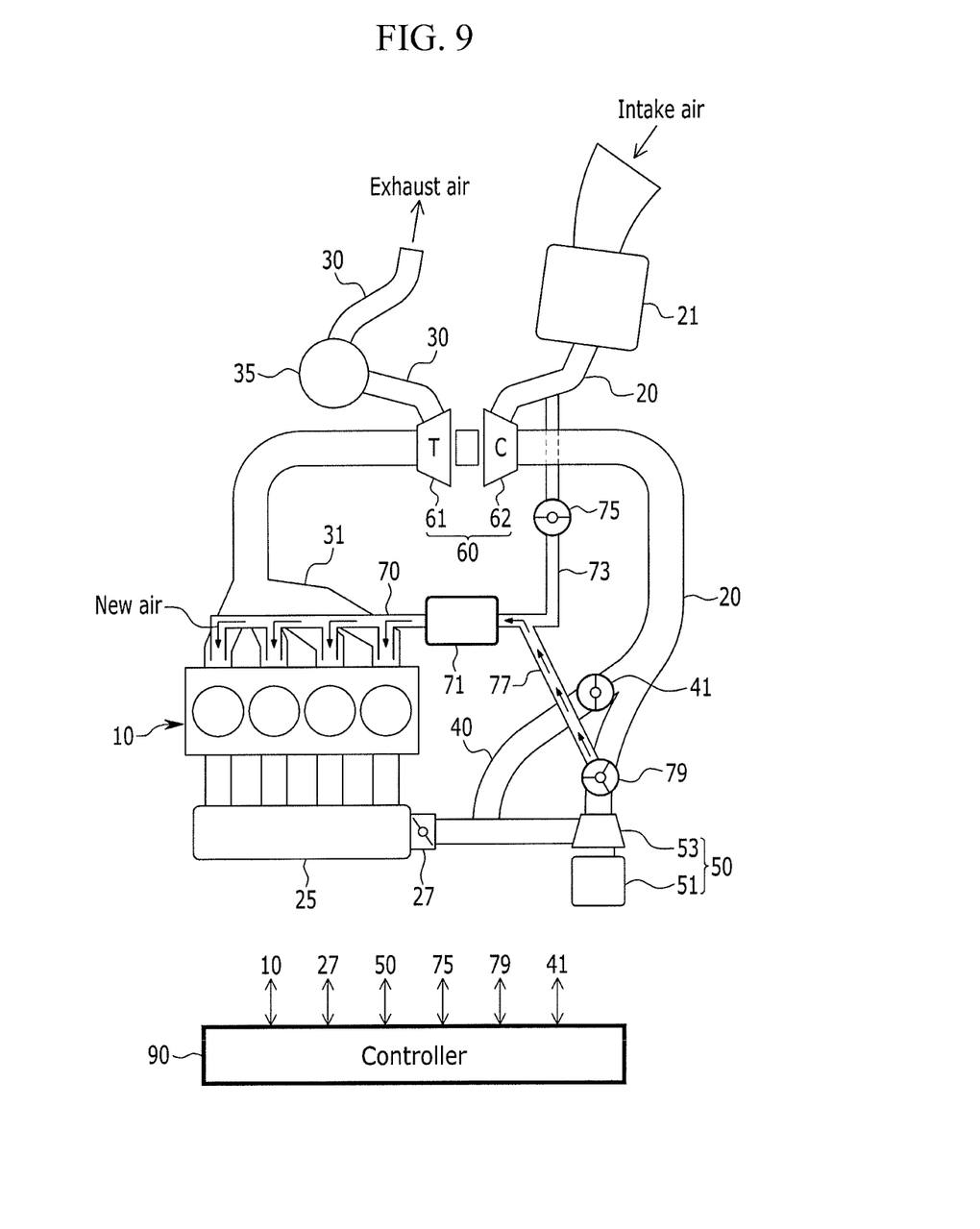

FIG. 8 and FIG. 9 are provided for description of operation of the secondary air injection system according to the various exemplary embodiments of the present invention.

First, when exhaust gas needs to be recirculated to the engine 10, the controller 90 controls the exhaust line 30 to fluidically-communicate and the intake line 20 and the air injection line 77 to be blocked through the three-way air amount control valve 79. Furthermore, the controller 90 controls the recirculation valve 75 to be opened.

As shown in FIG. 8, some of the exhaust gas flowing through the exhaust system is supplied to the intake line 20 at the upstream side of the compressor 62 through the main line 70 and the recirculation line 73. Furthermore, externally introduced intake air and recirculation gas are compressed by the compressor 62 and supplied to the cylinders through the intake line 20.

In an exemplary embodiment of the present invention, the bypass valve 41 may be selectively opened according to a driving condition of the vehicle.

When secondary air injection to an exhaust system (i.e., the exhaust manifold 31 or the exhaust line 30) is required, the controller 90 controls the recirculation valve 75 to be closed, the intake line 20 and the air injection line 77 to fluidically-communicate with each other and the intake line 20 to be blocked through the three-way air amount control valve 79, and the bypass valve 41 to be opened. Furthermore, the controller 90 operates the electric supercharger 50.

As shown in FIG. 9, air flowing through the intake line 20 is compressed by the electric supercharger 50, and then the compressed air is supplied to the exhaust system through the air injection line 77 and the main line 70. As such, exhaust gas is post-combusted by the secondary air supplied to the exhaust system such that harmful components included in the exhaust gas are removed. Furthermore, intake air is supplied to the cylinder of the engine 10 through the bypass line 40.

In the secondary air injection system according to the above-described exemplary embodiments of the present invention, the electric supercharger 50 performs a function as a conventional air pump for secondary air injection, and thus no additional air pump for secondary air injection is required. Furthermore, the recirculation line 73 for exhaust gas recirculation and the secondary air injection line 77 may be shared through the main line 70. Accordingly, the weight, the volume, and the manufacturing cost of a vehicle may be reduced.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A secondary air injection system comprising:
    an engine including at least a cylinder that generates a driving torque of a vehicle by combustion of a fuel;
    a main line which is connected to at least one of an exhaust manifold and an exhaust line which is connected to the at least a cylinder;
    a recirculation line which is branched from the main line and connected to an intake manifold;
    an air injection line which is branched from the main line and connected to an intake line connected to the intake manifold;
    a bypass line which is branched from a first side of the intake line and connected to a second side of the intake line;
    an electric supercharger provided in the intake line;
    a recirculation valve which is provided in the recirculation line and controls an amount of recirculation gas recirculated through the main line and the recirculation line;
    a three-way air amount control valve which is provided at a location where the air injection line and the intake line are connected and controls an air amount injected to the at least one of the exhaust manifold and the exhaust line through the air injection line and the main line; and
    a bypass valve provided in the bypass line.

2. The secondary air injection system of claim 1, Wherein the air injection line is connected to the intake line at a downstream side of the electric supercharger.

3. The secondary air injection system of claim 1, wherein, when exhaust gas recirculation is required, the three-way air amount control valve is opened such that the intake line and the air injection line are blocked, and the recirculation valve is opened such that an exhaust gas is supplied to the intake manifold from the at least one of the exhaust manifold and the exhaust line, according a signal of a controller.

4. The secondary air injection system of claim 1, wherein, when secondary air injection is required,
    the recirculation valve is closed, and the three-way air amount control valve is opened such that the intake line and the air injection line fluidically-communicate with each other and the intake line is blocked by the three-way air amount control valve, and the electric supercharger operates to inject air to the at least one of the exhaust manifold and the exhaust line, from the intake line, according a signal of a controller.

5. The secondary air injection system of claim 4, wherein the bypass valve is opened, according the signal of the controller, when secondary air injection is required.

6. The secondary air injection system of claim 1, further including an exhaust gas purification device which is provided in the exhaust line to purify the exhaust gas.

7. The secondary air injection system of claim 6, further including an exhaust gas purification. device which is provided in the exhaust line to purify the exhaust gas.

8. A secondary air injection system comprising:
    an engine including at least a cylinder that generates a driving torque of a vehicle by combustion of a fuel;
    a main line which is connected to at least one of an exhaust manifold and an exhaust line which is connected to the at least a cylinder;
    a turbocharger including a turbine which is provided in the exhaust line and rotates by an exhaust gas flowing through the exhaust line and a compressor which is provided in an intake line and rotates by a torque of the turbine to compress intake air flowing through the intake line connected to an intake manifold;
    a recirculation line which is branched from the main line and connected to the intake line at an upstream side of the compressor;
    an air injection line which is branched from the main line and connected to the intake line at a downstream side of the compressor;
    a bypass line which is branched from a first side of the intake line and connected to a second side of the intake line;
    an electric supercharger which is provided in the intake line;
    a. recirculation valve which is provided in the recirculation line to control an amount of a recirculation has recirculated through the main line and the recirculation line:
    a three-way air amount control valve which is provided at location where the air injection line and the intake fine are connected and controls an air amount injected to the at least one of the exhaust manifold and the exhaust line through the air injection line and the main line; and
    a bypass valve provided in the bypass line.

9. The secondary air injection system of claim 8, wherein, when exhaust gas recirculation is required,
    the three-way air amount control valve is opened such that the intake line and the air injection line are blocked, and the recirculation valve is opened such that an exhaust gas is supplied to the intake manifold from the at least one of the exhaust manifold and the exhaust line, according a signal of a controller.

10. The secondary air injection system of claim 8, wherein, when secondary air injection is required,
    the recirculation valve is closed, and the three-way air amount control valve is opened such that the intake line and the air injection line fluidically-communicate with each other and the intake line is blocked by the three-way air amount control valve, and the electric supercharger operates to inject air to the at least one of the exhaust manifold and the exhaust line from the intake line, according a signal of a controller.

11. The secondary air injection system of claim 10, wherein the bypass valve is opened, according the signal of the controller, when secondary air injection is required.

* * * * *